United States Patent [19]

Hoshino et al.

[11] Patent Number: 5,022,793
[45] Date of Patent: Jun. 11, 1991

[54] SCRAP COLLECTION SYSTEM

[75] Inventors: Kazuhiko Hoshino; Akio Ishii, both of Tokyo, Japan

[73] Assignee: Citizen Watch Co., Ltd., Tokyo, Japan

[21] Appl. No.: 315,511

[22] Filed: Feb. 27, 1989

[30] Foreign Application Priority Data

Feb. 27, 1988 [JP] Japan .............................. 63-24488[U]

[51] Int. Cl.$^5$ ............................................. B65G 53/14
[52] U.S. Cl. .................................... 406/153; 406/123; 406/171; 406/194
[58] Field of Search ............................. 406/151–153, 406/120, 123, 171, 194; 51/273, 270; 408/67, 56

[56] References Cited

U.S. PATENT DOCUMENTS

| | | | |
|---|---|---|---|
| 4,318,643 | 3/1982 | Larsson et al. | 406/151 X |
| 4,367,989 | 1/1983 | Smith | 406/153 |
| 4,422,565 | 12/1983 | Reba | 406/153 X |
| 4,764,058 | 8/1988 | Jones et al. | 406/153 X |

FOREIGN PATENT DOCUMENTS

| | | | |
|---|---|---|---|
| 61-24157 | 12/1986 | Japan . | |
| 545864 | 6/1942 | United Kingdom | 408/56 |

*Primary Examiner*—Margaret A. Focarino
*Assistant Examiner*—James M. Kannofsky
*Attorney, Agent, or Firm*—Wenderoth, Lind & Ponack

[57] ABSTRACT

A scrap collection system for collecting scraps produced when materials such as metals and plastics are processed by a processing machine such as a pressing machine and a lathe. A scrap receiver receives scraps from the processing machine and has at least one hopper positioned beneath the processing machine. A scrap collector box vertically below the hopper has at least one opening into which a conduit is directed for delivering scraps into the scrap collector box, and at least one opening having a filter for discharging air from the scrap collector box. A single unconstricted and unobstructed scrap conveying conduit extends in a straight vertical path from the hopper to the scrap collector box, and an air ejector is connected in the conduit at a position between the scrap receiver and scrap collector box and having an air passage opening into the periphery of the scrap passage at an angle to the scrap passage and toward the scrap collector box for ejecting high pressure air through the conduit in a direction toward the scrap collector box for creating a suction effect for moving scraps from the scrap receiver to the scrap collector box.

2 Claims, 1 Drawing Sheet

SCRAP COLLECTION SYSTEM

BACKGROUND OF THE INVENTION

1. Field of the Invention

The present invention relates to a system for collecting scraps produced when various materials such as metals and plastics are processed by processing machines such as pressing machines and lathes and, more particularly, relates to a system which can efficiently collect scraps by the use of a suction force generated by a flow of high-pressure air.

2. Statement of the Prior Art

Heretofore, two typical systems have been used to collect scraps produced from a pressing machine, i.e. a press, which is one example of a machine for processing materials, when punching is carried out thereby.

In the first system, scraps are collected by simply receiving them as they fall due to their own weight. In this case, a box for collecting scraps is placed below the punching tool of the pressing machine, and scraps produced by punching of sheets fall due to their own weight and are received in the box and collected.

The second system is a dust collector. One example of such a dust collector system is disclosed in, e.g., Japanese Utility Model Laid-Open No. 61-24157. This system is designed as a dust collector for a portable air grinder, and is characterized by having an air ejector fixedly provided on a lid member of a cylindrical tank, an air filter provided in the tank at the downstream end of a suction pipe leading to the air ejector, a compressed-air inlet passage in the ejector connected with an air supply pipe through a valve, said lid member being provided with a dust collection opening, and a dust suction duct for connecting an abrasive wheel cover of the grinder to the dust collection opening. The air supply line to the grinder is connected by a T-joint to the compressed air inlet passage.

However, such conventional scrap collection systems have the following disadvantages. A problem with the first system which simply collects falling scraps is that scraps are often prevented from falling because instead they are unintentionally deposited in a mold or the like, and are responsible for making dents in the products molded thereby, thus resulting in an increase in the number of defective products, a shortening in the service life of tools and a lowering of the efficiency of the system.

A problem with the second system, namely the dust collector, is that the size of the duct collector becomes very large, so that not only is there a need to provide a space sufficient for its installation, but the complicated equipment also leads to an increased cost. Another problem is that as the sharpness of the processing tools deteriorates, scraps are likely to ascend while sticking to the punches because of a lack of suction force of the dust collector, or holes or openings are clogged by scraps.

SUMMARY OF THE INVENTION

To overcome the problem described above, an object of the present invention is to provide a scrap collection system which has a structure so simple that it can be installed within a limited space, has high scrap collection ability, and can be assembled at low cost.

According to the present invention, that object is achieved by the provision of a scrap collection system which has a scrap receiver section for receiving scraps from a processing machine, a scrap collector box for collecting said scraps, and an air ejector means connected between said box and said receiver section and ejecting an amount of high-pressure air toward the box.

According to another aspect of the present invention, a joint is provided between the scrap receiver section and the air ejector for easy assembling or disassembling of the system.

The air ejector is connected at its upper end to the scrap receiver section and at its lower end to the scrap collector box. The air ejector is then connected at its intermediate portion with a pressure source for the high-pressure air for ejecting high-pressure air toward the scrap collector box. Thereupon, a negative pressure is generated in the upper end connected to the scrap receiver section by the flow of the high-pressure air, and scraps produced from a processing machine are sucked toward the scrap collector box by a suction force corresponding to that negative pressure, and collected in the scrap collector box.

BRIEF DESCRIPTION OF THE DRAWING

The present invention will now be explained, by way of example only, with reference to one specific embodiment illustrated in the accompanying drawing in which.

DETAILED DESCRIPTION OF THE INVENTION

Figure 1:
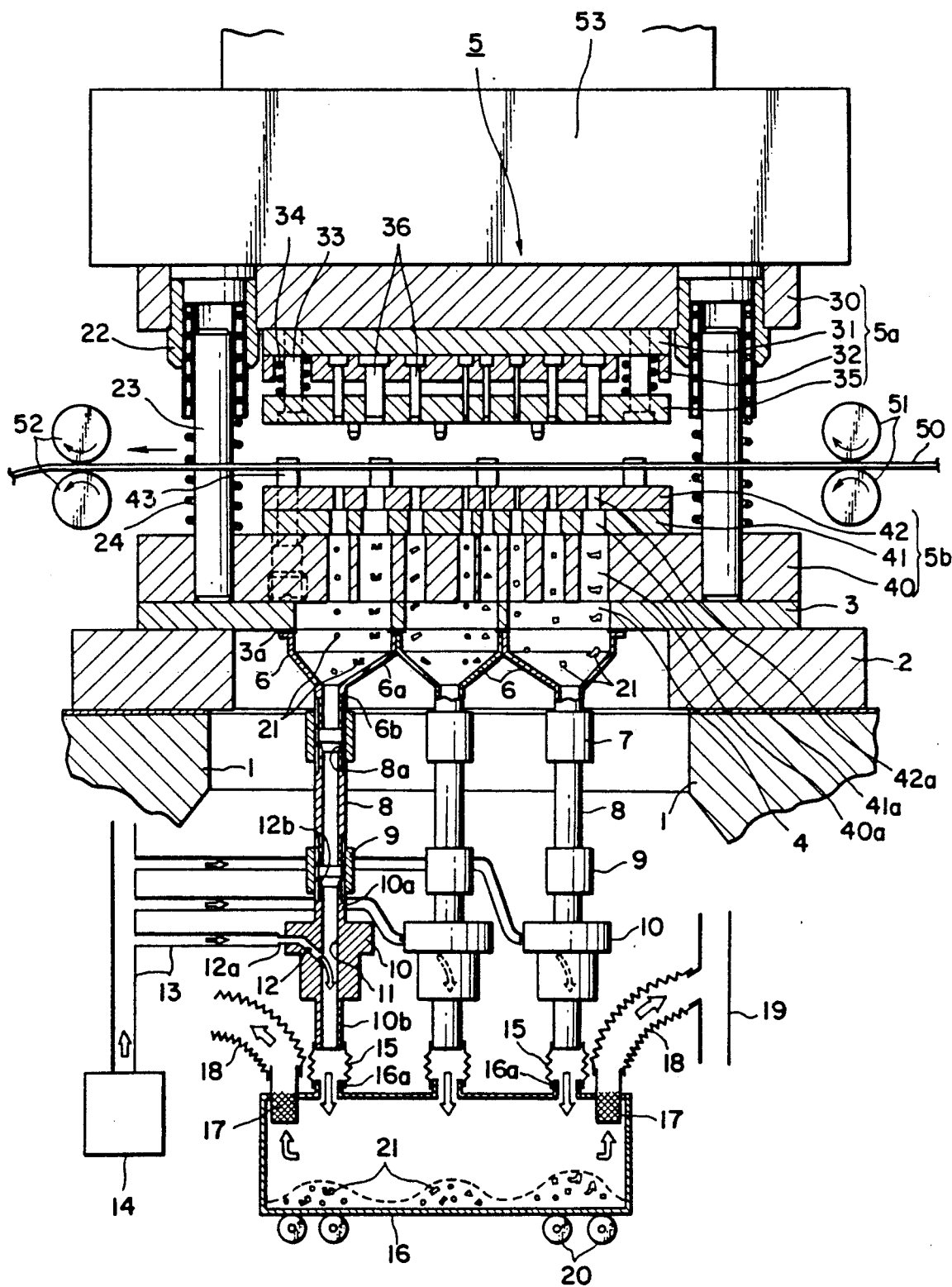
FIG. 1 is a schematic elevation view illustrative of one specific embodiment of the present invention.

Referring now to FIG. 1, reference numeral 1 designates a machine frame of a pressing machine that is one example of a processing machine to which the present invention is applicable. A bolster 2 is fixed to a pressing section of the machine frame 1, and an auxilary plate 3 is fixed to the bolster 2 by fixing means such as bolts. The auxiliary plate 3 is provided with a series of longitudinal slots 4 (three slots in the instant embodiment), and die means 5 is placed on the upper face of said auxiliary plate 3 with die members at positions corresponding to the positions of said longitudinal holes 4.

Each die means 5 contains a top die means 5a and a bottom die means 5b, which are positioned by four guide pins 23 having their lower ends fixed to the bottom die means 5b and their upper ends slidably inserted into four guide pin bushings 22 in the top die means 5a, and the respective die means are held with a predetermined vertical gap therebetween by a return spring 24 fitted over each guide pin 23.

The top die means 5a includes a punch holder 30 having guide pin bushings 22, a punch pad 31 secured to the punch holder 30, a punch plate 32 secured to the punch pad 30, a stripper plate 35 slidably mounted on four slide pins 33 in such a manner that the stripper plate 35 is movable toward or away from the punch plate 32, and a number of punches 36 having their extreme ends extending through the stripper plate 35 and their base ends supported by the punch plate 32. The bottom die means 5b includes a die holder 40 secured to the auxiliary plate 3, a die pad 41 secured to the die holder 40, a die receiver 42 secured to the die pad 41 and a plurality of workpiece supporting pins 43 held in such a manner that they are movable toward or away from the die holder 40. A workpiece 50 held by the workpiece supporting pins 43, for example a band plate, is intermittently fed by feed rollers 51 and 52 disposed at the inlet and outlet of the die means 5.

During such feeding, scraps 21 are discharged out of the die means 5 by the pressure of a slider 53 of the pressing machine, pass through a die hole 42a in the die receiver 42, a pad hole 41a in the die pad 41 and a holder hole 40a in the die holder 40.

The scrap collection system of the present invention comprises the auxiliary plate 3 with the slots 4 therein, secured to the lower face of said auxiliary plate 3, air ejectors 10, and scrap collector box 16.

Each hopper 6 includes a funnel-like receiver 6a and a threaded shaft portion 6b provided on the bottom of the receiver 6a and extending downward, said shaft portion 6b being threadedly connected with one end of a joint 7. The joint 7 is threadedly connected at the other end with the upper end of a connecting pipe 8. Said connecting pipe 8 is threadedly connected at the lower end with one end of a joint 9, said joint 9 being threadedly connected at the other end with an air ejector 10.

The air ejector 10 includes a body having lateral extensions 10a and 10b of a smaller diameter at both ends, an axial passage 11 extending axially through said body and a plurality of inclined passages 12 each having one end open out of the side of said body, extending downwardly at an angle through a thick portion of said body, and having the other end open in the axial passage 11. The upper extension 10a is connected to the other end of said joint 9. An outer opening 12a for the inclined passage 12 is connected by supply passage 13 with an air feeder 14 for generating an amount of high-pressure air such as an air compressor.

Such an air ejector 10 is preferably formed of a material having a relatively high hardness, such as a steel material or the like, but may be constructed from brass and other metal materials. Further, an opening in the extension 10a of the air ejector 10 opposite to the axial passage 11 is tapered outwardly at 12b, thereby facilitating the inflowing of the scraps 21 into the air ejector 10. The extension 10b of the air ejector 10 is connected with one end of an axially expandable joint 15, which is connected at the other end to a connector portion 16a formed on an upper face plate of a scrap collector box 16. The upper face plate of the scrap collector box 16 is provided with a filter 17 having an inlet located therein. An outwardly projecting portion of the filter 17 is connected with one end of a connecting pipe 18, which is connected at the other end with an exhaust pipe 19. In FIG. 1, reference numeral 20 designates wheels attached to the lower side of the scrap collector box 16.

It is to be understood that a scrap receiver section for receiving the scraps 21 produced by pressing and punching is defined by said auxiliary plate 3 and the hoppers 6. Between the hoppers 6 and the auxiliary plate 3, there is interposed a sealing member 3a, thereby providing a seal therebetween. Further, it is preferred that the connections of the joint 7 with the hopper 6 and the connecting pipe 8, as well as the connections of the joint 9 with the connecting pipe 8 and the air ejector 10, be sealed by sealants.

The opening at the end of connecting pipe 8 which is toward the hopper 6 is tapered at 8a, as is the upper end of the air ejector 10 at the joint 9, thereby facilitating the inflowing of the scraps 21.

The operation of the instant embodiment will now be described.

The attachment of the instant system to a pressing machine is typically effected as follows.

First, the scrap receiver section having the hoppers 6 previously fixed to the back side of the auxiliary plate 3 is attached to a predetermined position on bolster 2 of the machine frame 1. Thereafter, the die means 5 is attached to said pressing machine, and the air ejectors 10 are connected to the scrap receiver section by the pipes 8.

More specifically, the connecting pipes 8 are connected to the hoppers 6 through the joints 7 and to the air ejectors 10 through the joints 9. Then, the side openings 12a in the air ejectors 10 are connected with a supply pipe 13 connected to an air feeder 14, while the one ends of the expandable joints 15 are connected to the smaller diameter extensions 10b of the air ejectors 10 and the other ends thereof are connected to the connectors 16a of the scrap collector box 16, thereby connecting the air ejectors 10 to the scrap collector box 16.

In this state, the pressing machine is actuated to initiate pressing, while high-pressure air is supplied to the air ejectors 10 by the actuation of the air feeder 14. Thereupon, the scraps 21 discharged by pressing and punching in the die means 5 fall down into the hoppers 6 through the die holes 42a, pad holes 41a, holder holes 40a and longitudinal slots 4 in the auxiliary plate 3, while the high-pressure air fed by the air ejectors 10 is caused to flow toward the scrap collector box 16 through the inclining passages 12.

As a result, a negative pressure is generated at the hoppers 6 by the stream of said high-pressure air, so that an amount of air present in the scrap receiver is sucked toward the scrap collector box 16, and the scraps 21 are accelerated by the suction force and flow rapidly into the box 16 through the axial passages 11. Only the scraps 21 accumulate within the scrap collector box 16, while the air flows into the exhaust pipe 19 through the filters 17 and the connecting pipes 18. In this manner, the air, free from any scraps 21, is discharged from the scrap collector box 16.

In this case, the freely falling scraps 21, whether small or large, are exhausted and surely sucked into and collected in the scrap collector box 16, since they are sucked by the suction force of the air stream. Thus, it is possible to prevent the scraps 21 from being deposited on a workpiece due to the tackiness of oils, etc. and to prevent the die holes 42a, etc.; from being clogged by the scraps 21 and flashings produced during processing.

It is therefore possible to effectively prevent the occurrence of dents on the surfaces of the workpieces being processed, which may otherwise occur due to residual scraps 21 sticking to the workpieces, thereby considerably increasing the number of workpieces that can be processed until the dies 5 are repolished, thus making is possible to increase productivity and the service life of the die means 5. Hence, it is possible to improve the efficiency of the machine on account of an increase in the service life of the die means 5 and an increase in the clearance of scraps from the die means 5, thus making molding-making easier.

In this connection, the results of tests performed by the present inventors have shown that the defective part of a lot of workpieces due to dents is 2% on the average in the prior art, whereas it is 0.2% on the average when the present system is used. In other words, it is decreased to one-tenth that of the prior art. At the same time, it has been found that the number of workpieces which can be pressed until repolishing of the die means 5 is necessary is about 140,000 in the prior art, whereas it is increased to about 420,000, or tripled, by the use of the present system.

Because the joints 7 and 9 are interposed between the scrap receiver and the air ejectors 10, the vertical space between the machine frame 1 of the pressing machine and the scrap collector box 16 can easily be adjusted by the adjustment of the length of the connecting pipes 8. In addition, since the air ejectors 10 are formed of a steel material and have the openings of the axial passages 11 extending through the extensions 10a of a smaller diameter tapered at 12b, the abrasion of the air ejectors 10 by the flowing scraps 21 can be reduced so that said air ejectors 10 can be used over a longer period of time than if they were not tapered.

In the instant embodiment, since the scrap receiver is constituted by the auxiliary plate 3 and the hoppers 6, said receiver can relatively easily be attached in place after previous fixation of the hoppers 6 to the auxiliary plate 3, and the vacuum can be increased because the volume of the hoppers can be made smaller than in a conventional collector, so as to thereby increase the suction force. Further, because of the simple structure in which connections are made only between the scrap receiver and the scrap collector box 16 by the air ejectors 10, the overall size of the system can be reduced and it can be used with a pressing machine in which there is limited space below its pressing section.

While the foregoing embodiment has been described specifically with reference to the collection of scraps generated by sheet metal processing with a pressing machine, the present invention is not limited thereto. For instance it will be understood that the present invention is useful not only for the collection of scraps of other metal materials such as copper alloys from other processing machines such as lathes and milling machines, but also for the collection of various materials other than metals, e.g. plastics.

Further, while the foregoing embodiment has been described as having the scrap receiver constituted by both the auxiliary plate and the hoppers, the scrap receiver may be constituted by the hoppers alone, which can be fixed directly to the mold.

According to the present invention as described above, between the scrap receiver section and the scrap collector box there is interposed the air ejector for ejecting the high-pressure air toward the scrap collector box. Thus, the present invention has the advantages that it is possible to prevent scraps produced from a processing machine, such as a pressing machine, from being deposited on workpieces due to the tackiness of oils, etc.. and from clogging up die holes, etc. by flashings, etc..occurring during processing; to rapidly and efficiently suck and remove scraps from molds; to effectively reduce the occurrence of defective products by dents resulting from residual scraps; and to considerably increase the service life of the processing tools such as molds. In addition, the increase in the service life of molds, etc. is accompanied by an increase in the efficiency of a processing machine and an increase in the clearance of dies. This leads to another advantage that the dies can be easily fabricated.

Further advantages of the present invention are easy attachment or detachment of the air ejector to or from the scrap receiver section can be achieved because a joint is interposed between the scrap receiver section and the air ejector, and the present system can be installed in a limited space and manufactured at low cost because of its simple structure and small dimensions.

We claim:

1. A scrap collection system for collecting scraps produced when materials such as metals and plastics are processed by a processing machine such as a pressing machine and a lathe, comprising;
    a scrap receiver means for receiving scraps from the processing machine and which has at least one hopper having an open top for positioning beneath the part of the processing machine form which scraps will fall during the normal processing operation of the processing machine;
    a scrap collector box vertically below said hopper and in which the scraps are to be collected and having at least one opening into which a conduit is directed for delivering scraps into said scrap collector box, and at least one opening having a filter for discharging air from said scrap collector box;
    a single unconstricted and unobstructed scrap conveying conduit extending in a straight vertical path from said hopper to said scrap collector box; and
    an air ejector means connected in said conduit at a position between said scrap receiver means and said scrap collector box and having an ejector body having an unobstructed scrap passage therethrough forming part of said conduit and an air passage extending from outside said ejector body through said ejector body and opening into the periphery of said scrap passage at an angle to the scrap passage and toward said scrap collector box for ejecting high pressure air through said conduit in a direction toward said scrap collector box for creating a suction effect for moving scraps from said scrap receiver means to said scrap collector box.

2. A scrap collection system as claimed in claim 1, further comprising a joint detachably connected between said scrap receiver means and said air ejector means for permitting assembly of said scrap receiver means and said air ejector means in a confined space beneath the processing machine.

* * * * *